(12) United States Patent
Lee et al.

(10) Patent No.: US 9,660,714 B2
(45) Date of Patent: May 23, 2017

(54) TWO-WAY RELAY APPARATUS AND METHOD THEREOF

(71) Applicants: Samsung Electronics Co., Ltd., Gyeonggi-do (KR); Korea University Research and Business Foundation, Seoul (KR)

(72) Inventors: Inkyu Lee, Seoul (KR); Haewook Park, Seoul (KR); Changick Song, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 194 days.

(21) Appl. No.: 14/304,789

(22) Filed: Jun. 13, 2014

(65) Prior Publication Data

US 2014/0369255 A1    Dec. 18, 2014

(30) Foreign Application Priority Data

Jun. 13, 2013 (KR) .................. 10-2013-0067669

(51) Int. Cl.
*G01R 31/08* (2006.01)
*H04L 12/16* (2006.01)
(Continued)

(52) U.S. Cl.
CPC ......... *H04B 7/0639* (2013.01); *H04B 7/0417* (2013.01); *H04B 7/155* (2013.01)

(58) Field of Classification Search
CPC .. H04B 7/0639; H04B 7/0634; H04B 7/2128; H04J 13/16; H04L 47/10
See application file for complete search history.

(56) References Cited

U.S. PATENT DOCUMENTS

| | | | |
|---|---|---|---|
| 2010/0227606 A1* | 9/2010 | Nan | H04B 7/2606 455/422.1 |
| 2010/0232384 A1* | 9/2010 | Farajidana | H04L 5/005 370/329 |

(Continued)

OTHER PUBLICATIONS

Namyoon Lee, et al., "Linear Precoder and Decoder Design for Two-Way AF MIMO Relaying System", Scientific Computing Laboratory, School of Electrical Engineering and Computer Science, Korea Advanced Institute of Science and Technology, IEEE, 2008, pp. 1221-1225.

(Continued)

*Primary Examiner* — Brian Roberts
*Assistant Examiner* — Abu-Sayeed Haque

(57) ABSTRACT

One or more embodiments provide an apparatus and a method to estimate channel information even when channel information is not accurately known and design a relay filter based on the estimated information in a two-way relay system where a terminal having a single antenna and a relay exist. A relay apparatus of a two-way relay system includes a receiver, a controller, and a transmitter. The receiver receives a signal from at least one terminal. The controller estimates a channel between the terminals based on the received signal, and calculates a receiver matrix and a precoder. The transmitter transmits a signal precoded by the precoder.

15 Claims, 12 Drawing Sheets

(51) Int. Cl.
  *H04J 3/00* (2006.01)
  *H04B 7/06* (2006.01)
  *H04B 7/0417* (2017.01)
  *H04B 7/155* (2006.01)

(56) References Cited

U.S. PATENT DOCUMENTS

| | | | | |
|---|---|---|---|---|
| 2010/0248729 | A1* | 9/2010 | Yu | H04B 7/026 455/450 |
| 2011/0164661 | A1* | 7/2011 | Frenger | H04B 7/15542 375/211 |
| 2012/0015659 | A1* | 1/2012 | Kalyani | H04W 72/085 455/436 |
| 2012/0076025 | A1* | 3/2012 | Barbieri | H04L 5/0023 370/252 |
| 2012/0263210 | A1 | 10/2012 | Panah et al. | |
| 2013/0235807 | A1* | 9/2013 | Lee | H04W 16/28 370/329 |
| 2013/0242761 | A1* | 9/2013 | Park | H04B 7/0452 370/252 |
| 2013/0242947 | A1* | 9/2013 | Chen | H04W 72/04 370/335 |
| 2013/0301487 | A1* | 11/2013 | Khandani | H04W 16/14 370/278 |
| 2014/0016714 | A1* | 1/2014 | Chen | H04B 7/024 375/260 |
| 2014/0113677 | A1* | 4/2014 | Parkvall | H04W 52/146 455/522 |
| 2015/0156651 | A1* | 6/2015 | Nilsson | H04W 16/28 455/67.11 |
| 2016/0134342 | A1* | 5/2016 | Kneckt | H04B 7/0452 375/267 |

OTHER PUBLICATIONS

Gen Li, et al., "Optimal Linear MMSE Beamforming for Two Way Multi-Antenna Relay Systems", IEEE Communications Letters, vol. 15, No. 5, May 2011, pp. 533-535.

Gongpu Wang, et al., "Joint CFO and Channel Estimation for OFDM-Based Two-Way Relay Networks", IEEE Transactions on Wireless Communications, vol. 10, No. 2, Feb. 2011, pp. 456-465.

* cited by examiner

<1st Phase>

TWO-WAY RELAY APPARATUS AND METHOD THEREOF

PRIORITY

The present application is related to and claims the benefit under 35 U.S.C. §119(a) of a Korean patent application filed in the Korean Intellectual Property Office on Jun. 13, 2013 and assigned Serial No. 10-2013-0067669, the entire disclosure of which is hereby incorporated by reference.

TECHNICAL FIELD

The present disclosure relates to a relay system. More particularly, the present disclosure relates to a two-way relay system.

BACKGROUND

A device-to-device (D2D) system where communication is performed inside a multi cell system or an ad-Hoc network may include a two-way relay system. In a communication system including this two-way relay (referred to as a 'two-way relay system' hereinafter), terminals which are close geographically under a wireless environment transmit/receive a signal via a two-way relay that uses a so-called amplify-and-forward (AF) protocol.

A two-way relay system may improve spectral efficiency about two times compared to a one-way relay system. This performance improvement may be obtained by a process where two terminals transmit information to a relay simultaneously during a first time slot, and the relay transmits the information again to the terminals during a second time slot. At this point, each terminal may cancel self-interference (self-interference cancellation (SIC)) that occurs when a signal transmitted by the terminal itself is received again by way of the relay. However, when using a two-way relay system, relay filter design techniques proposed on the assumption that channel information is accurately known for SIC and relay filter design are mostly used. For example, papers by N. Lee, H. Park, and J. Chun, "Linear precoding and decoder design for two-way AF MIMO relaying system", Proc. ICC 08, 2008. and G. Li, Y. Wang, and P. Zhang, "Optimal linear MMSE beamforming for two-way multiantenna relay systems", IEEE Communications Letters, May, 2011 propose methods for repeatedly obtaining a matrix corresponding to a relay filter and SIC on the assumption that channel information is accurately known.

For a two-way relay system to properly operate in an actual system and take effect, how channel information may be estimated and how a relay filter may be designed based on the estimated information are important issues. Paper by G. Wang, F. Gao, Y. -C. Wu, and C. Tellambura, "Joint CFO and channel estimation for OFDM-based two-way relay networks", IEEE Transactions on Wireless Communications, February, 2011 proposes a channel estimation method for performing SIC successfully under a circumstance where all terminals and a relay have one antenna. However, this channel estimation method is difficult to extend to a system where a plurality of antennas exists. Therefore, a technique for effectively performing SIC via relay filter design and channel estimation, capable of resolving above-described limitations and remarkably improving performance of a two-way relay needs to be proposed.

SUMMARY

To address the above-discussed deficiencies, it is a primary object to provide a two-way relay having a plurality of antennas that communicates with a terminal having a single antenna, and a signal processing method thereof.

Another aspect of the present disclosure is to provide an apparatus and a method for estimating a channel and designing a relay filter even in the situation where channel information is not accurately known in a two-way relay system.

Still another aspect of the present disclosure is to provide a two-way relay that minimizes a mean square error and a signal processing method thereof.

In accordance with an aspect of the present disclosure, a relay apparatus of a two-way relay system is provided. The relay apparatus includes a receiver for receiving a signal from at least two terminals, a controller for estimating a channel between the terminals based on the received signal, and calculating a receiver matrix and a precoder, and a transmitter for transmitting a signal precoded by the precoder.

In accordance with another aspect of the present disclosure, an operating method by a relay of a two-way relay system is provided. The method includes receiving a signal from at least two terminals, estimating a channel between the terminals based on the received signal, and calculating a receiver matrix and a precoder, and transmitting a signal precoded by the precoder.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1A to 10C and the various embodiments described below and used for describing principles of the present disclosure in this patent document are intended for showing only an example and should not be construed as anything that limits the scope of the disclosure. A person of ordinary skill in the art would understand that the principles of the present disclosure may be implemented in a properly arranged two-way relay system.

Embodiments of the present disclosure to be described below relate to a two-way relay that may be included in a multi-cell system such as a D2D system or an ad-hoc network, and a signal processing method thereof. Hereinafter, a two-way AF relay system where terminals have one antenna and a relay has a plurality (ex: Nr) of antennas and which processes a signal according to an amplify-and-forward (AF) protocol will be considered. However, it is noted that embodiments of the present disclosure are equally applicable to a terminal having a plurality of antennas.

A two-way relay according to an embodiment of the present disclosure may be an inband relay applied to a situation where a forward channel and a backward channel are the same. A two-way relay according to another embodiment of the present disclosure may be an outband relay applied to a situation where a forward channel and a backward channel are different. Here, the forward channel denotes a transmission channel from a terminal to a relay, and the backward channel denotes a transmission channel from a relay to a terminal. Also, in describing embodiments of the present disclosure, the following mathematical marks and abbreviations are used.

Figure 1B:
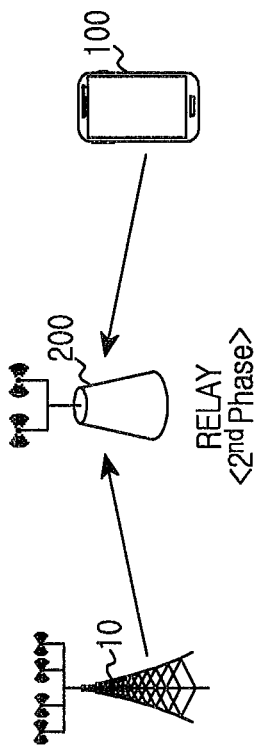
FIGS. 1A and 1B illustrate an example of a construction of a two-way relay system to which embodiments of the present disclosure are applied.
Figure 1A:
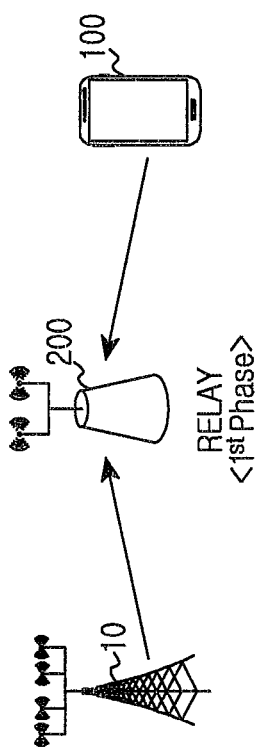

TABLE 1 tr(•) or Tr(•): a trace of a diagonal matrix
$(•)^T$: a transpose of a matrix or a vector
$(•)^H$: a complex conjugate transpose of a matrix or a vector
$(•)^*$: a conjugate of a matrix or a vector
$(•)^{-1}$: an inversion of a diagonal matrix
|q|: an absolute value of q
||q||: a norm of q
SIC: Self-Interference Cancellation
MSE: Mean Square Error
SRS: Sounding Reference Signal
URS: User-specific Reference Signal
PMI: Precoding Matrix Index FIG. 1 illustrates an example of a construction of a two-way relay system to which embodiments of the present disclosure are applied. This drawing represents an example where a two-way relay is used in a cellular system.

Referring to FIG. 1, a cellular system includes a base station 10, a terminal 100, and a relay 200. In a first phase (or a first time slot), the base station 10 and the terminal 100 transmit a signal to the relay 200. In a second phase (or a second time slot), the relay 200 multiplies a received signal by a relay filter or matrix to transmit the same to the base station 10 and the terminal 100. For example, the relay 200 is a two-way relay that processes a signal according to an AF protocol.

FIG. 2 illustrates a simplified construction of a two-way relay system illustrated in FIG. 1.

Figure 2A:
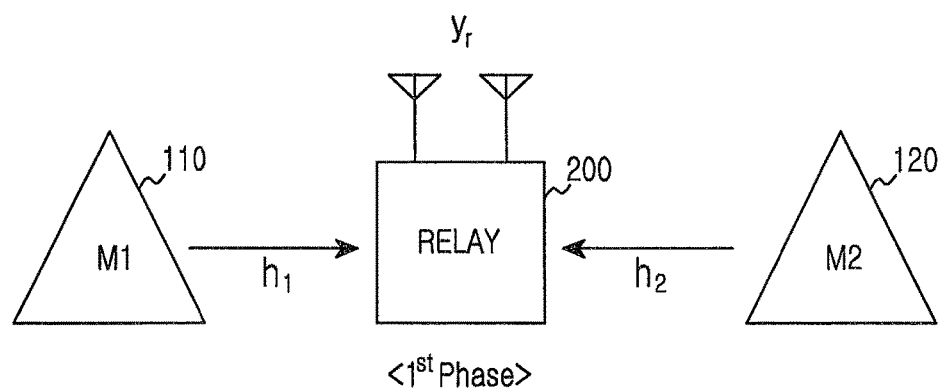
FIGS. 2A and 2B illustrate a simplified construction of a two-way relay system illustrated in FIGS. 1A and 1B.

Referring to FIG. 2A, in a first phase, a relay 200 receives a signal from a first terminal M1 110 and a second terminal M2 120. $y_r$ is a signal received from the relay 200. $h_1$ is a forward channel that transmits a signal from the first terminal M1 110 to the relay 200, and $h_2$ is a forward channel that transmits a signal from the second terminal M2 120 to the relay 200.

Figure 2B:
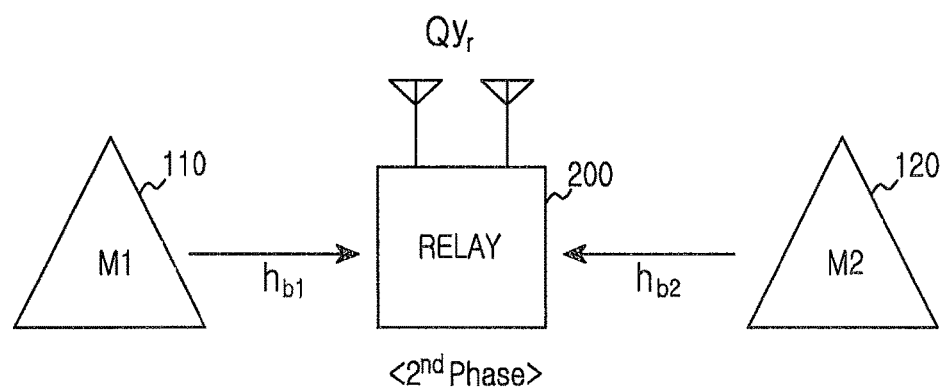

Referring to FIG. 2B, in a second phase, the relay 200 multiplies a reception signal $y_r$ by a relay matrix Q to transmit the signal to the first terminal M1 110 and the second terminal M2 120. $h_{b1}$ is a backward channel that transmits a signal from the relay 200 to the first terminal M1 110, and $h_{b2}$ is a backward channel that transmits a signal from the relay 200 to the second terminal M2 120.

According to an embodiment of the present disclosure, the forward channel $h_1$ from the terminal 110 to the relay 200 and the backward channel $h_{b1}$ from the relay 200 to the terminal 110 are the same, and the forward channel $h_2$ from the terminal 120 to the relay 200 and the backward channel $h_{b2}$ from the relay 200 to the terminal 120 are the same.

According to another embodiment of the present disclosure, the forward channel $h_1$ from the terminal 110 to the relay 200 and the backward channel $h_{b1}$ from the relay 200 to the terminal 110 are different, and the forward channel $h_2$ from the terminal 120 to the relay 200 and the backward channel $h_{b2}$ from the relay 200 to the terminal 120 are different.

Figure 3:
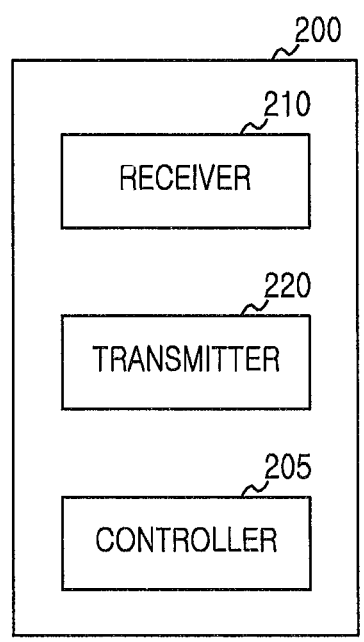
FIG. 3 illustrates the construction of a relay according to an embodiment of the present disclosure.

FIG. 3 illustrates the construction of a relay 200 according to an embodiment of the present disclosure.

Referring to FIG. 3, the relay 200 includes a receiver 210, a transmitter 220, and a controller 205. The receiver 210 receives a signal from terminals 110 and 120. The transmitter 220 transmits a signal to the terminals 110 and 120. The controller 205 controls an overall signal process operation of the relay 200. For example, the controller 205 controls an operation for an inband relay according to an embodiment of the present disclosure illustrated in FIG. 5. For another example, the controller 205 controls an operation for an outband relay according to another embodiment of the present disclosure illustrated in FIG. 5.

According to embodiments of the present disclosure, the receiver 210 receives a signal from at least one terminal. The controller 205 estimates a channel between terminals based on a reception signal, and calculates a receiver matrix L and a precoder $\tilde{p}$. The transmitter 220 transmits a signal precoded by the precoder.

According to an embodiment of the present disclosure, the controller 205 determines whether a terminal may cancel self-interference based on an SIC indicator included in a reception signal. In the situation where the terminal may cancel self-interference, the controller 205 precodes a signal into which a user specific reference signal has been inserted.

According to another embodiment of the present disclosure, the controller 205 calculates a precoder based on a precoding matrix index (PMI) included in a reception signal. The PMI is calculated by a terminal and then included in a fed-back control signal. A terminal estimates a backward channel from the relay 200, and the PMI is calculated based on the estimated result.

The controller 205 estimates a channel between terminals based on a sounding reference signal included in a reception signal. The controller 205 precodes a signal from which the sounding reference signal has been removed and into which a user specific reference signal has been inserted.

<Inband Relay>

FIG. 4 illustrates a signal processing operation by an inband relay according to an embodiment of the present disclosure.

According to an embodiment of the present disclosure, a forward channel $h_1$ from a terminal 110 to a relay 200 and a backward channel $h_{b1}$ from the relay 200 to the terminal 110 are the same, and a forward channel $h_2$ from a terminal 120 to the relay 200 and a backward channel $h_{b2}$ from the relay 200 to the terminal 120 are the same. This may be expressed in terms of a formula according to Equation (1).

$$h_1 = h_{b1}, \quad h_2 = h_{b2} \quad (1)$$

A signal $y_r$ received by the relay 200, a signal $y_1$ received by the first terminal 110, and a signal $y_2$ received by the second terminal 120 are given by Equation (2) below.

$$y_r = h_1 x_1 + h_2 x_2 + n_r$$
$$y_1 = h_{b1}^T Q h_1 x_1 + h_{b1}^T Q h_2 x_2 + h_{b1}^T Q n_r + n_1$$
$$y_2 = h_{b2}^T Q h_1 x_1 + h_{b2}^T Q h_2 x_2 + h_{b2}^T Q n_r + n_2 \quad (2)$$

where Q is a relay filter (or a relay matrix) calculated by the relay 200 based on channel information, and the like, $n_r$ is a noise vector in the relay 200, $n_1$ and $n_2$ are noise values seen by the first terminal 110 and the second terminal 120, respectively. Here, it is assumed that respective noise elements are complex Gaussian whose average is 0 and dispersion is 1. In Equation (2), $h_{b1}^T Q h_1 x_1$ and $h_{b2}^T Q h_2 x_2$ correspond to self-interferences generated when signals transmitted by the respective terminals 110 and 120 to the relay 200 come back to the terminals 110 and 120 by way of the relay 200. Since the respective terminals 100 and 120 know data is sent by themselves, when only information of an effective channel that has passed through the relay 200 can be known, self-interference may be effectively removed. That is, the respective terminals 110 and 120 may perform self-interference cancellation (SIC). For example, when effective channel information $h_{b1}^T Q h_1$ can be known, the terminal 110 may perform SIC. When effective channel information $h_{b2}^T Q h_2$ can be known, the terminal 120 may perform SIC.

Hereinafter, content of designing a relay filter that minimizes a mean square error (MSE) using Equation (1) is described. A problem of minimizing an MSE may be represented by Equation (3) below.

$$\min_{Q,\gamma} E\left[\|\gamma^{-1} y_d - (F+B)x\|^2\right] \quad (3)$$
$$\text{s.t. } Tr(Q R_{y_r} Q^H) \leq P_R$$

In Equation (3), $y_d$ may be represented by Equation (4) below, which corresponds to expressing equation for $y_1$ and equation for $y_2$ of Equation (2) all together in the vector form.

$$y_d = GQHx + GQn_r + n_d \quad (4)$$

where $G=[h_{b1}^T; h_{b2}^T]$, $H=[h_1 \; h_2]$, $x=[x_1; x_2]$, and B is a matrix corresponding to SIC. B is defined as $$B = \begin{bmatrix} h_{b1}^T Q h_1 & 0 \\ 0 & h_{b2}^T Q h_2 \end{bmatrix},$$

and F is a switching matrix and is defined as $$F = \begin{bmatrix} 0 & 1 \\ 1 & 0 \end{bmatrix}.$$

In Equation (3) again, $R_{y_r}$ is a covariance matrix of a relay reception signal, defined as $R_{y_r} + H R_x H^H + I$, where $$R_x = \begin{bmatrix} P_1 & 0 \\ 0 & P_2 \end{bmatrix}.$$

$P_i (i=1,2)$ is transmission power of each terminal.

As known from the definition of the above matrix B, Q and B are correlated with each other. Therefore, Equation (3) is very difficult to directly solve. A conventional technique is a repeatedly optimizing method and uses a very high complexity, and a derived solution has a disadvantage of not providing insight for system understanding.

In an embodiment of the present disclosure, to obtain a relay Q, it is assumed that B is fixed first, and a Lagrangian function is applied to Equation (3). When a Lagrangian function is applied, Equation (3) is equal to Equation (5) below.

$$L(Q,\gamma) = E\left[\|\gamma^{-1} y_d - (F+B)x\|^2\right] - \lambda(Tr(Q R_{y_r} Q^H) - P_R) \quad (5)$$
$$= Tr(\gamma^{-2} G Q R_y Q^H G^H + \gamma^{-2} I -$$
$$\gamma^{-1}(B+F) R_x H^H Q^H G^H - \gamma^{-1} G Q H R_x (B+F)^H +$$
$$(B+F) R_x (B+F)^H) - \lambda(Tr(Q R_{y_r} Q^H) - P_R).$$

To find out a solution that minimizes Equation (5), Karush-Kuhn-Tucker (KKT) condition is used. The KKT condition is given by Equation (6) below.

$$\nabla_{Q^*} L(\gamma,Q) = 0,$$
$$\nabla_{\gamma} L(\gamma,Q) = 0,$$
$$\lambda \geq 0, Tr(Q R_{y_r} Q^H) - P_R \leq 0,$$
$$\lambda \{Tr(Q R_{y_r} Q^H) - P_R\} = 0 \quad (6)$$

A solution meeting the four conditions represented by Equation (6) is given by Equation (7) below.

$$\hat{Q} = \gamma(G^H G + 2P_r^{-1} I)^{-1} G^H (B+F) R_x H^H (H R_x H^H + I)^{-1} \quad (7)$$
$$\triangleq P(B+F) L$$

where $Q = (G^H G + 2P_r^{-1} I)^{-1} G^H (B+F) R_x H^H (H R_x H^H + I)^{-1}$, $$\gamma = \sqrt{\frac{P_r}{tr(QR_{y_r}Q^H)}},$$

$P=\gamma(G^H G+2P_r^{-1}I)^{-1}G^H$, $L=R_x H^H(HR_x H^H+I)^{-1}$ are defined, and $\gamma$ is a scaling variable for adjusting to power limit of a relay filter.

Referring to Equation (7), a relay filter Q according to an embodiment of the present disclosure may be divided into a relay reception filter L and a relay transmission filter P.

A matrix B corresponding to SIC may be obtained using the filter obtained by Equation (7). For this purpose, an error covariance matrix expressed by Equation (8) is considered.

$$R_e = (\gamma^{-1} y_d - (B+F)x)(\gamma^{-1} y_d - (B+F)x)^H \quad (8)$$

When Equation (8) is expanded, Equation (9) below is obtained.

$$tr(R_e) = tr\left\{(B+F)\tilde{R}_{y_r}(B+F)\left(\frac{P_r}{N_r}GG^H + I\right)^{-1} + \right. \quad (9)$$

$$(B+F)(H^H R_n^{-1} H + R_x^{-1})^{-1}(B+F)\right\} \approx$$

$$tr\left\{R_x^{1/2}(B+F)\left(\frac{P_r}{N_r} \cdot GG^H + I\right)^{-1}(B+F)R_x^{1/2} + \right.$$

$$(B+F)(H^H R_n^{-1} H + R_x^{-1})^{-1}(B+F)\right\}$$

In Equation (9), the second approximation uses a property that a covariance matrix of a relay reception signal in a high signal-to-noise ratio (SNR) is approximated to a covariance signal of a terminal transmission signal, which is represented by Equation (10) below.

$$\tilde{R}_{y_r} \triangleq (H^H H + R_x^{-1})^{-1} H^H H R_x \approx R_x \quad (10)$$

When an approximation equation of Equation (9) is used, an SIC correspondence matrix B that minimizes Equation (8) may be obtained. Equation (9) is a convex function with respect to B under a condition that $R_x$ is a diagonal matrix. Therefore, B that minimizes Equation (9) may be obtained by obtaining a solution of a quadratic equation with respect to Equation (9). The obtained solution is Equation (11) below.

$$\hat{B} = \begin{bmatrix} \alpha & 0 \\ 0 & \beta \end{bmatrix} \quad (11)$$

In Equation (11), $$\alpha = -\frac{q + P_1 b^H}{\gamma + P_1 c}, \beta = -\frac{q + P_2 b^H}{\gamma + P_2 c}$$

$$(H^H R_n^{-1} H + R_x^{-1})^{-1} = \begin{bmatrix} p & q \\ q^H & \gamma \end{bmatrix}, \left(\frac{P_r}{N_r} \cdot GG^H + I\right)^{-1} = \begin{bmatrix} a & b \\ b^H & c \end{bmatrix}$$

Here, what is important is that unlike the conventional technique, a relay filter Q and an SIC correspondence matrix B are independent from each other in a technique proposed according to an embodiment of the present disclosure. Therefore, the repeatedly optimizing process may be omitted, and a closed form solution may be found.

When using an MMSE relay design described up to now, information of $h_1$ and $h_2$ in a relay is used for relay filter design. Also, for a terminal to perform SIC perfectly, information of $h_1$ and $h_2$ is used. However, terminals could use the conventional channel estimation algorithm in order to know channel information perfectly, and lots of time slots are used during this process, such that a system overhead becomes very large. Therefore, a new method that may implement SIC using an MMSE relay filter proposed according to an embodiment of the present disclosure is proposed.

A signal received by the first terminal 110 illustrated in FIG. 4 is expressed by Equation (12).

$$y_{d1} = h_{b1}^T Q h_1 x_1 + h_{b1}^T Q h_2 x_2 + h_{b1}^T Q n_r + n_{d1} \quad (12)$$

$$= h_{b1}^T Q(Hx + n_r) + n_{d1}$$

$$= h_{b1}^T P(B+F)L(Hx + n_r) + n_{d1}$$

$$\approx h_{b1}^T \tilde{P} y + n_{d1}$$

In Equation (12), the third equation is a result of inputting Equation (7) to Equation (12) and expanding the same and is given by $\tilde{P}=P(B+F)$, $y=L(Hx+n_r)$.

Under an assumption of high SNR, when approximation of $y \approx x$ is allowed, when SIC is applied, Equation (13) below is obtained.

$$y_{d1} = h_{b1}^T \tilde{P}(:,1)x_1 + h_{b1}^T \tilde{P}(:,2)x_2 + n_{d1} - h_{b1}^T \tilde{P}(:,1)x_1 \quad (13)$$

$$= h_{b1}^T \tilde{P}(:,2)x_2 + n_{d1}$$

As known from Equation (13), information of $h_1$ and $h_2$ may not need to be known, respectively. Since only effective channel information $h_{b1}^T \tilde{P}$ may need to be known when using the proposed SIC, a system overhead may be remarkably reduced. Therefore, a channel obtaining method capable of knowing this effective channel information is proposed.

Referring to FIG. 4A again, this corresponds to the first phase of the two-way relay 200. In this stage, the respective terminals 110 and 120 transmit sound sequences (or reference signals) $S_1$ and $S_2$ which are orthogonal to each other to the relay 200 such that the relay 200 may estimate a channel. Then, the relay 200 estimates channels $h_1$ and $h_2$ based on the received sound sequences. Also, the relay 200 calculates a minimum MSE relay filter Q based on a channel estimated result.

Figure 4A:
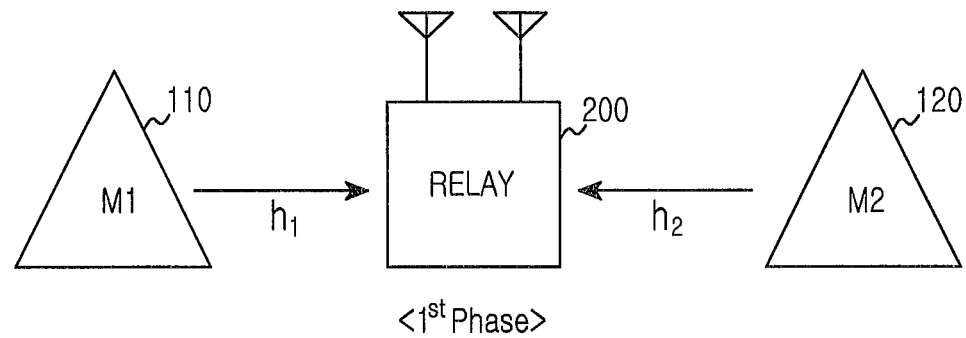
FIGS. 4A and 4B illustrate a signal processing operation by a relay according to an embodiment of the present disclosure.
Figure 4B:
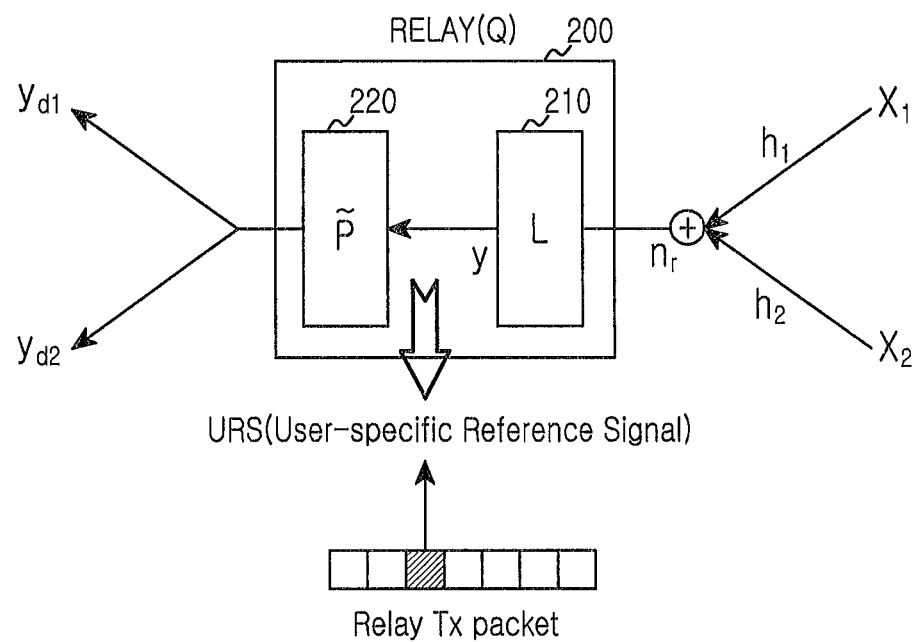

Referring to FIG. 4B, in the second phase, the relay 200 removes transmission sounding signals of a terminal that have passed through a relay reception filter L 210. This signal corresponds to y. After that, the relay 200 adds a user-specific reference signal (URS) and transmits the same to the terminals 110 and 120 by way of a relay filter transmitter $\tilde{P}$ 220.

Then, respective terminals 110 and 120 estimate effective channels $h_{b1}^T \tilde{P}$ received in themselves based on a received URS. When the effective channel is estimated as described above, an SIC method proposed according to an embodiment of the present disclosure may be implemented.

Figure 5:
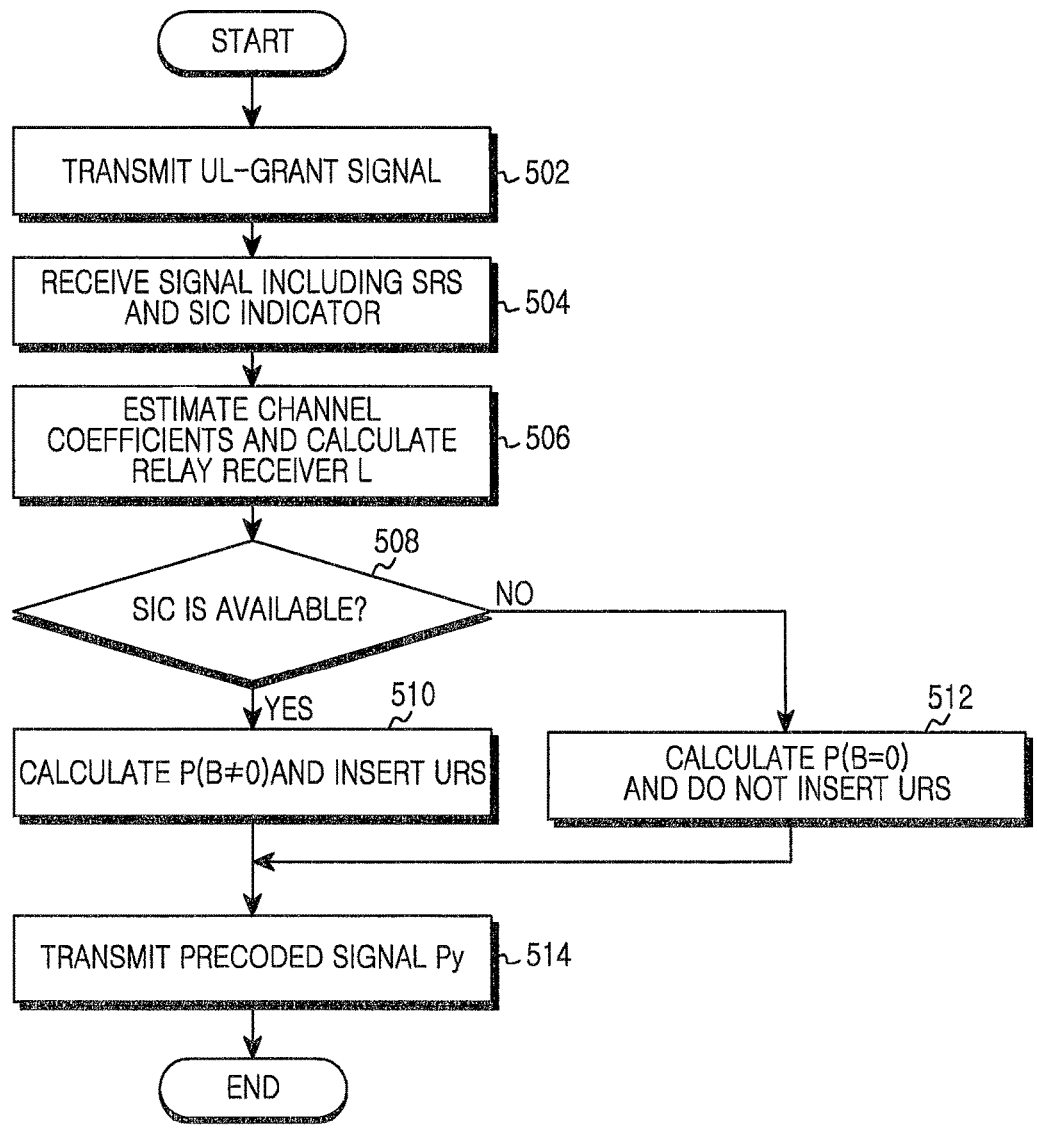
FIG. 5 illustrates a signal processing operation by a relay according to an embodiment of the present disclosure.

FIG. 5 illustrates a signal processing operation by a relay according to an embodiment of the present disclosure.

Referring to FIG. 5, the relay 200 transmits an uplink (UL) grant signal to a pair of mobile terminals 110 and 120 in operation 502.

The relay 200 receives a signal transmitted by the mobile terminals 110 and 120 in operation 504. At this point, a reception signal is a signal including a Sounding Reference Signal (SRS) and a Self-Interference Cancellation (SIC) indicator.

The relay estimates channel coefficients for channels between the terminals 100 and 120 using a received SRS, and calculates a relay receiver L using the estimated channel coefficients in operation 506.

The relay 200 determines whether SIC is available using a received SIC indicator in operation 508. In the situation where the SIC is available, the relay 200 calculates P(B≠0), and inserts a User-Specific Reference Signal (URS) in operation 510. In the situation where the SIC is not available, the relay 200 calculates P(B=0), and does not insert a User-Specific Reference Signal (URS) in operation 512.

The relay 200 transmits a precoded signal Py to the terminals 110 and 120 in operation 514.

Figure 6:
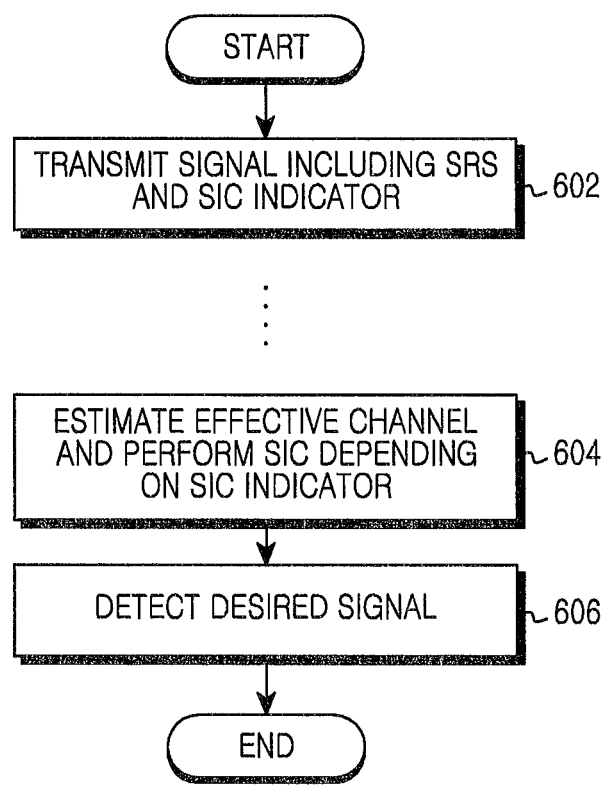
FIG. 6 illustrates a process at a terminal cooperating with a signal processing operation by the relay illustrated in FIG. 5.

FIG. 6 illustrates a process at a terminal cooperating with a signal processing operation by the relay illustrated in FIG. 5.

The terminals 110 and 120 transmit a signal including an SRS and an SIC indicator to the relay 200 in operation 602. This operation 602 corresponds to operation 504 of FIG. 5.

The terminals 110 and 120 estimate an effective channel and perform SIC depending on an SIC indicator in operation 604. The effective channel may be estimated using an URS included in a received signal. This operation 604 corresponds to operation 514 of FIG. 5.

The terminals 110 and 120 detect a desired signal from a received signal in operation 606.

<Outband Relay>

Figure 7A:
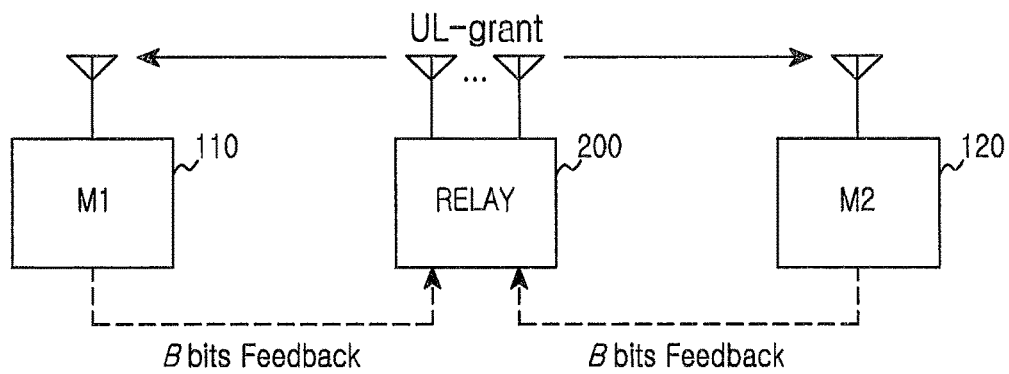
FIGS. 7A to 7C illustrate a signal processing operation by a relay according to another embodiment of the present disclosure.
Figure 7B:
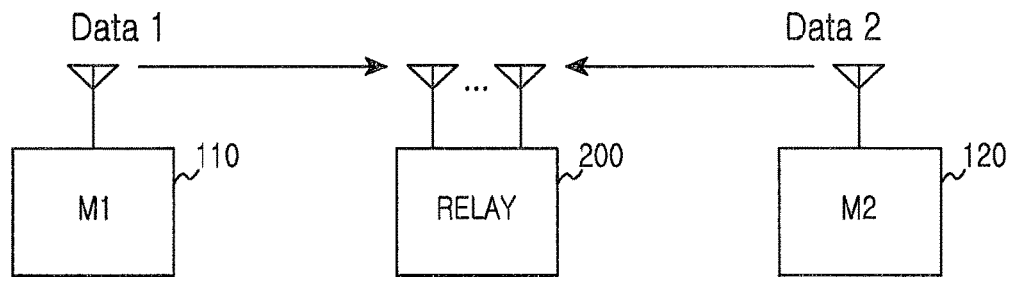
Figure 7C:
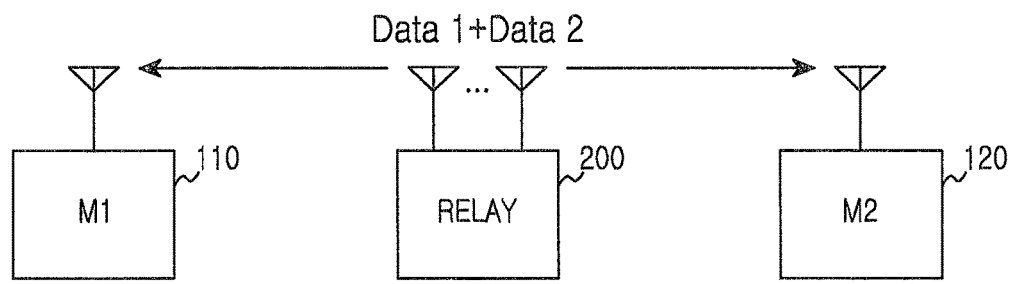

FIGS. 7A to 7C illustrate a signal processing operation by a relay according to another embodiment of the present disclosure.

According to another embodiment of the present disclosure, a forward channel $h_1$ from a terminal 110 to a relay 200 and a backward channel $h_{b1}$ from the relay 200 to the terminal 110 are different from each other, and a forward channel $h_2$ from a terminal 120 to the relay 200 and a backward channel $h_{b2}$ from the relay 200 to the terminal 120 are different from each other ($h_1 \neq h_{b1}, h_2 \neq h_{b2}$). This outband relay is related to a Frequency Division Duplex (FDD) system.

When using an outband relay, information of H and G could be known for optimized relay filter design based on a minimum mean square error (MMSE). That is, both a forward channel and a backward channel could be known. When H and G are used, an optimized MMSE filter may be obtained using Equation (14) below. This may be obtained using the same method that has been used when the inband relay filter is obtained.

$$\tilde{Q} = \gamma (G^H G + 2P_r^{-1} I)^{-1} G^H (B+F) R_x H^H (HR_x H^H + I)^{-1} \quad (14)$$
$$= \tilde{P} L$$

where $\tilde{P} = \gamma (G^H G + 2P_r^{-1} I)^{-1} G^H (B+F),$
$L = R_x H^H (HR_x H^H + I)^{-1}.$ Similarly with the inband relay, the outband relay filter may be divided into a transmission filter portion $\tilde{P}$ and a reception filter portion L.

However, since a channel estimation process performed for knowing all channel information gives lots of overheads to the system, it is difficult to think the channel estimation process is practical. Generally, when using a forward channel, estimation may be performed using a sounding sequence of each terminal, and when a backward channel, the relay may obtain information of H and G in a way in which each terminal performs estimation using a sounding sequence of a relay and informs the relay of the estimated result again. Therefore, another embodiment of the present disclosure proposes a quantized preprocess technique for filter design of an outband relay in a more practical aspect.

Referring to FIG. 7A, in a first phase, respective terminals 110 and 120 estimate backward channels $h_{b1}$ and $h_{b2}$ from the relay 200 to the respective terminals 110 and 120 based on an uplink-grant (UL-grant) signal transmitted by the relay 200. After that, the respective terminals 110 and 120 transmit precoding matrix index (PMI) information (ex: B bit) to the relay 200 as limited feedback. Then, the relay 200 designs a relay preprocess filter based on codebook information. Now, for optimized performance, a method for determining feedback information is described.

A reception signal of the first terminal 110 is given by Equation (15) below.

$$y_{d1} = h_{b1}^T Q h_1 x_1 + h_{b1}^T Q h_2 x_2 + h_{b1}^T Q n_r + n_{d1} \quad (15)$$
$$= h_{b1}^T \tilde{P} L (Hx + n_r) + n_{d1}$$
$$\approx h_{b1}^T [P(:,1) \ P(:,2)] \begin{bmatrix} x_1 \\ x_2 \end{bmatrix} + n_{d1}$$

The second approximation of Equation (15) has been calculated from high SNR approximation. To maximize a signal that has passed through an SIC process, each terminal i determines PMI k using Equation (16).

$$w_i(k) = \arg\max_{w_i(j) \in C} |h_{bi}^T w_i(j)|^2 \text{ for } i = 1, 2, \text{ where} \quad (16)$$
$$C_i = \{w_i(1), \ldots, w_i(2^B)\}$$

Referring to FIG. 7B, in the second phase, the respective terminals 110 and 120 transfer an obtained codebook index k in a limited feedback method for the relay 200. The relay 200 obtains a relay transmission filter using Equation (17) below based on the received codebook index k.

$$\tilde{P} = [\hat{w}_2 \ \hat{w}_1] \quad (17)$$

PMI information is conveyed on a control signal and sent to the relay 200. Also, the respective terminals 110 and 120 transmit a data signal in which an SRS has been embedded to the relay 200. The relay 200 configures a relay transmission filter based on the received PMI, estimates a forward channel via which a signal is transmitted from the terminals 110 and 120 to the relay 200 based on the SRS, and designs a relay reception filter L based on this estimated forward channel.

Referring to FIG. 7C, in a third phase, similarly with an inband relay, the relay 200 removes an SRS from a signal that has passed through the receiver 210 of FIG. 4, embeds an URS, and transmits a signal by way of the relay transmitter 220. Lastly, the respective terminals 110 and 120 perform SIC according to Equation (18) using an effective channel estimated based on the received URS.

$$y_{d1} \approx h_{b1}^T [P(:,1) \ P(:,2)] \begin{bmatrix} x_1 \\ x_2 \end{bmatrix} + n_{d1} \qquad (18)$$

$$\tilde{y}_{d1} = \frac{1}{h_{b1}^T \tilde{P}(:,2)} \left( y_{d1} - h_{b1}^T \tilde{P}(:,1) x_1 \right)$$

Figure 8:
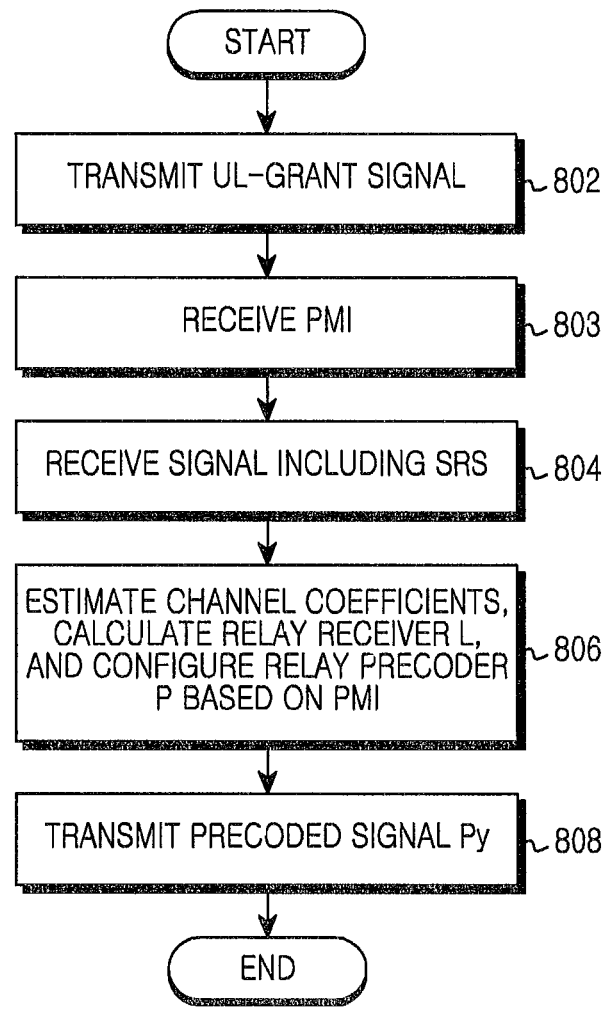
FIG. 8 illustrates a signal processing operation by a relay according to another embodiment of the present disclosure.

FIG. 8 illustrates a signal processing operation by a relay according to another embodiment of the present disclosure.

Referring to FIG. 8, the relay 200 transmits an uplink (UL)-grant signal to a pair of mobile terminals 110 and 120 in operation 802.

The relay 200 receives PMI information transmitted by the mobile terminals 110 and 120 in operation 803. Next, the relay 200 receives a signal transmitted by the mobile terminals 110 and 120 in operation 804. At this point, a reception signal is a signal including an SRS.

The relay 200 estimates channel coefficients for channels between the terminals 110 and 120 using the received SRS, calculates a relay receiver L using the estimated channel coefficients, and configures a relay precoder based on PMI in operation 806.

The relay 200 transmits a precoded signal Py to the terminals 110 and 120 in operation 808.

Figure 9:
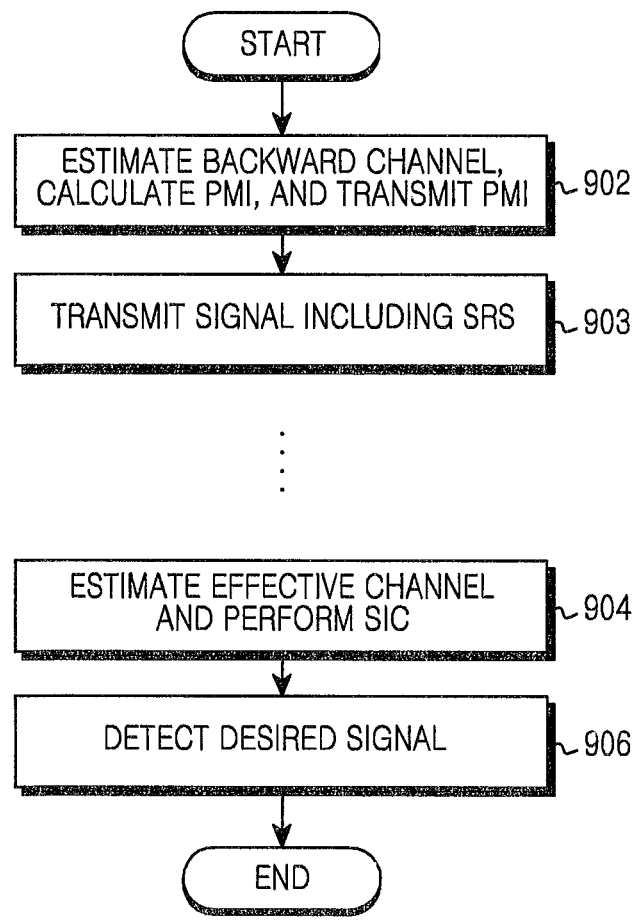
FIG. 9 illustrates a process at a terminal cooperating with a signal processing operation by the relay illustrated in FIG. 8.

FIG. 9 illustrates a process at a terminal cooperating with a signal processing operation by the relay illustrated in FIG. 8.

The terminals 110 and 120 estimate a backward channel and calculate PMI in operation 902. The information of the calculated PMI is transmitted to the relay 200. Next, the terminals 110 and 120 transmit a signal including an SRS to the relay 200 in operation 903. This operation 903 corresponds to operation 804 of FIG. 8.

The terminals 110 and 120 estimate an effective channel and perform SIC in operation 904. The effective channel may be estimated by a URS included in a received signal. This operation 904 corresponds to operation 808 of FIG. 8.

The terminals 110 and 120 detect a desired signal from a received signal in operation 906.

Figure 10A:
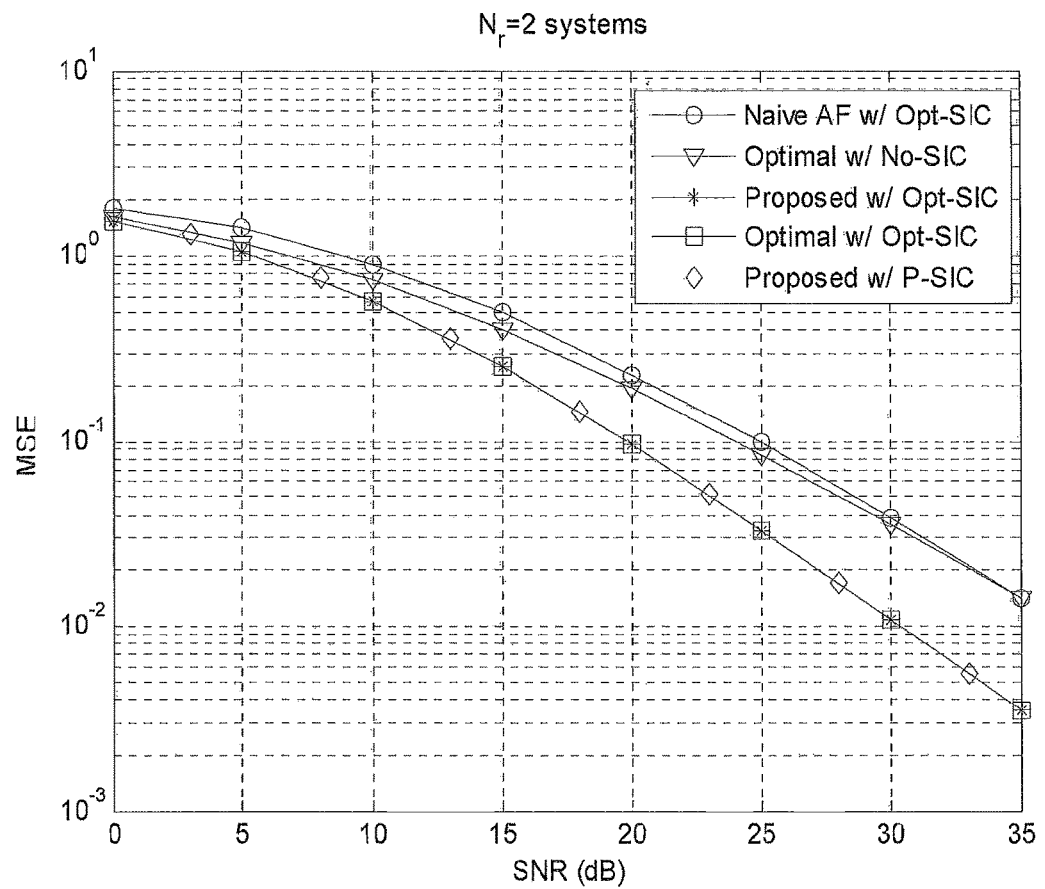
FIGS. 10A to 10C illustrate simulation results according to embodiments of the present disclosure.
Figure 10B:
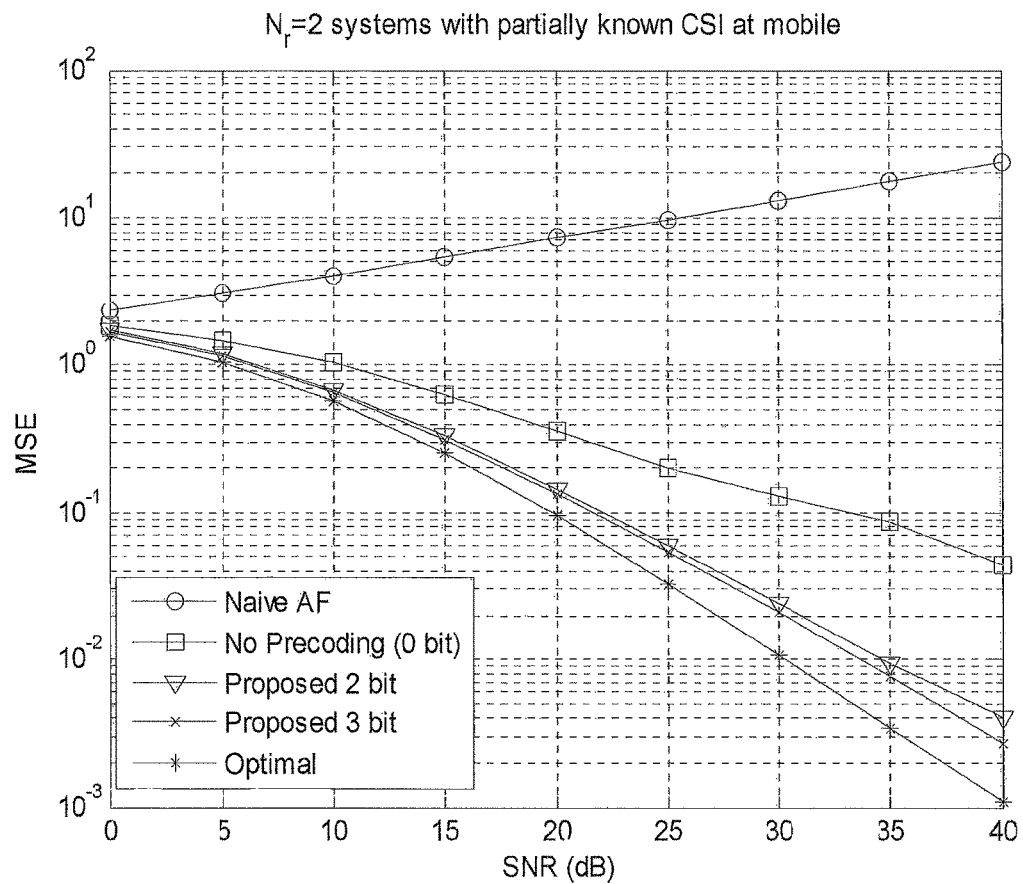
Figure 10C:
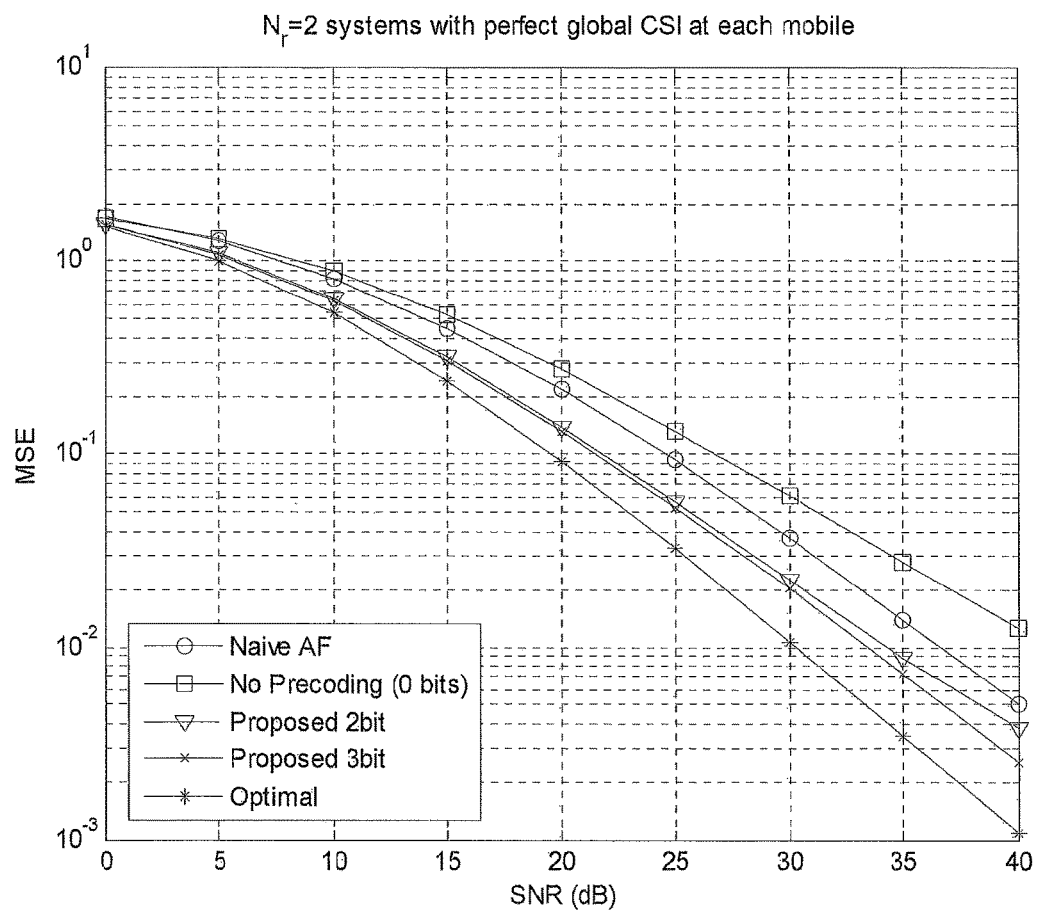

FIGS. 10A to 10C illustrate simulation results according to embodiments of the present disclosure. A channel during simulation has considered Rayleigh fading.

FIG. 10A illustrates performance of an inband relay system according to an embodiment of the present disclosure. In FIG. 10A, Naive represents a method where a relay does not perform any preprocess. Optimal represents a method of repeatedly designing a relay filter, proposed by the reference [2]. Opt-SIC represents a situation where a terminal knows all channels and relay filters and performs SIC perfectly, and P-SIC represents a proposed method. As known from the drawing, the proposed relay filter design and the proposed SIC signal processing technique show almost the same performance as the performance of the filter design optimized via a complicated process and the method that uses the SIC method that may be implemented when all channel information could be known.

Necessary channel information of each method is given by Table 2 below

TABLE 2

|  | Relay | Mobile 1 |
|---|---|---|
| Optimal (Opt-SIC) | h1, h2 | h1, h2 |
| Proposed (P-SIC) | h1, h2 | $\mathbf{h}_1^T \tilde{\mathbf{P}}$ |

FIG. 10B is a view illustrating a performance of an outband relay system according to another embodiment of the present disclosure, and shows a simulation result under a circumstance where each terminal may know only channel information coming back to itself. For feedback, Grassmannian codebook has been used. Here, Optimal is a reference curve representing an optimized performance when having all channel information. When using the naive technique, since SIC cannot be performed, as SNR increases, MSE increases gradually. Alternatively, when using the quantized relay filter technique, it has been revealed that performance approaching Optimal may be achieved using only a 2-bit feedback.

FIG. 10C illustrates a simulation result in the situation where a terminal has all channel information. It has been revealed that the proposed technique still shows better performance than the naive technique.

According to the above-described embodiments of the present disclosure, channel information may be estimated even when channel information is not accurately known and a relay filter may be designed based on the estimated information in a two-way relay system where a terminal having a single antenna and a relay having a plurality of antennas exist. At this point, a receiver filter and a transmitter filter (precoder) of the relay are discriminated and designed. Through design of this relay filter and channel estimation, a terminal may effectively perform SIC.

Although the disclosure has been shown and described with reference to certain example embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A relay apparatus of a two-way relay system, the relay apparatus comprising:
    at least one transceiver; and
    at least one processor coupled to the at least one transceiver,
    wherein the at least one processor is configured to:
        receive, from a terminal, a first signal comprising a self-interference cancellation (SIC) indicator;
        determine, based on the SIC indicator, availability of SIC for the terminal; and
        transmit, to the terminal, a second signal precoded based on the first signal,
    wherein the second signal comprises a user-specific reference signal (URS) corresponding to the terminal, and
    wherein the URS is used, by the terminal, for performing the SIC.

2. The apparatus of claim 1, wherein the second signal is precoded based on a precoder, and
    wherein the precoder is determined based on a precoding matrix index (PMI) included in the first signal.

3. The apparatus of claim 2, wherein the PMI is calculated by the terminal.

4. The apparatus of claim 1, wherein the second signal is precoded based on a precoder, and
wherein the precoder is determined based on a sounding reference signal included in the first signal.

5. The apparatus of claim 4, wherein the at least one processor is further configured to:
remove a sounding reference signal (SRS) from the first signal; and
add the URS to a location of the SRS.

6. The apparatus of claim 1, wherein the SIC indicator is included in the first signal.

7. An operating method by a relay of a two-way relay system, the method comprising:
receiving, from a terminal, a first signal comprising a self-interference cancellation (SIC) indicator;
determining, based on the SIC indicator, availability of SIC for the terminal; and
transmitting, to the terminal, a second signal precoded based on the first signal,
wherein the second signal comprises a user-specific reference signal (URS) corresponding to the terminal, and
wherein the URS is used, by the terminal, for performing the SIC.

8. The method of claim 7, wherein the second signal is precoded based on a precoder, and
wherein the precoder is determined based on a precoding matrix index (PMI) included in the first signal.

9. The method of claim 8, wherein the PMI is calculated by the terminal.

10. The method of claim 7, wherein the second signal is precoded based on a precoder, and
wherein the precoder is determined based on a sounding reference signal included in the first signal.

11. The method of claim 10, further comprising:
removing a sounding reference signal (SRS) from the first signal; and
adding the URS to a location of the SRS.

12. A terminal apparatus of a two-way relay system, the apparatus comprising:
at least one transceiver; and
at least one processor coupled to the at least one transceiver, wherein the at least one processor is configured to:
transmit, to a relay station, a first signal comprising a self-interference cancellation (SIC) indicator;
receive, from the relay station, a second signal precoded based on the first signal the second signal comprising a user-specific reference signal (URS) corresponding to the terminal; and
perform (SIC) based on the URS,
wherein the SIC indicator is used to determine availability of SIC for the terminal by the relay station.

13. The apparatus of claim 12, wherein the SIC indicator is included in the first signal.

14. The apparatus of claim 12, wherein the second signal is precoded, by the relay station, based on a precoder, and
wherein the precoder is determined, by the relay station, based on a sounding reference signal (SRS) included in the first signal.

15. The apparatus of claim 14, wherein the at least one processor is further configured to:
receive at least one reference signal from the relay station; and
determine a precoding matrix index (PMI) based on the at least one reference signal,
wherein the first signal includes the PMI.

* * * * *